(12) United States Patent
Maeda et al.

(10) Patent No.: US 11,014,566 B2
(45) Date of Patent: May 25, 2021

(54) OBJECT DETECTION APPARATUS

(71) Applicant: DENSO CORPORATION, Kariya (JP)

(72) Inventors: Yu Maeda, Nisshin (JP); Hirohiko Yanagawa, Kariya (JP); Mitsuyasu Matsuura, Nisshin (JP)

(73) Assignee: DENSO CORPORATION, Kariya (JP)

(*) Notice: Subject to any disclaimer, the term of this patent is extended or adjusted under 35 U.S.C. 154(b) by 182 days.

(21) Appl. No.: 16/345,026

(22) PCT Filed: Oct. 10, 2017

(86) PCT No.: PCT/JP2017/036714
§ 371 (c)(1),
(2) Date: Apr. 25, 2019

(87) PCT Pub. No.: WO2018/079252
PCT Pub. Date: May 3, 2018

(65) Prior Publication Data
US 2019/0276030 A1 Sep. 12, 2019

(30) Foreign Application Priority Data
Oct. 27, 2016 (JP) .............................. JP2016-210555

(51) Int. Cl.
B60W 40/04 (2006.01)
B60W 30/095 (2012.01)
(Continued)

(52) U.S. Cl.
CPC ........ *B60W 40/04* (2013.01); *B60W 30/0956* (2013.01); *G01S 7/292* (2013.01);
(Continued)

(58) Field of Classification Search
CPC ............. B60W 40/04; B60W 30/0956; B60W 2420/42; B60W 2420/54; G01S 7/292;
(Continued)

(56) References Cited

U.S. PATENT DOCUMENTS

| 9,440,585 B2* | 9/2016 | Obata ................... G08G 1/165 |
| 2010/0185390 A1* | 7/2010 | Monde .................. G01C 21/26 701/532 |

(Continued)

FOREIGN PATENT DOCUMENTS

| JP | 63-177091 A | 7/1988 |
| JP | 6-214015 A | 8/1994 |

(Continued)

*Primary Examiner* — Mia M Thomas
(74) *Attorney, Agent, or Firm* — Maschoff Brennan

(57) ABSTRACT

An object detection apparatus is provided with a distance measurement sensor that measures a distance to an object which exists in a surrounding area of a vehicle, by transmitting scanning waves to the surrounding of the vehicle and receiving reflection waves of the scanning waves, and an image acquiring section that is adopted to the vehicle, and is provided with an on-vehicle camera that captures images in the surrounding of the vehicle, the imaging acquiring section acquiring an image that is captured by the camera. The apparatus includes a determination section that determines whether, a predetermined object that is difficult to detect by the reflection waves of the distance measurement sensor is included in the object image, and a sensitivity control section that increases a sensitivity of the object detection by the distance measurement sensor and a vehicle control that is executed relative to the predetermined object as a target object.

20 Claims, 6 Drawing Sheets

(51) Int. Cl.
*G01S 7/292* (2006.01)
*G01S 7/53* (2006.01)
*G01S 7/539* (2006.01)
*G01S 15/66* (2006.01)
*G01S 15/93* (2020.01)
*G06K 9/00* (2006.01)
*G01S 7/529* (2006.01)
*G08G 1/16* (2006.01)
*G01S 13/93* (2020.01)

(52) U.S. Cl.
CPC ............... *G01S 7/529* (2013.01); *G01S 7/53* (2013.01); *G01S 7/539* (2013.01); *G01S 15/66* (2013.01); *G01S 15/93* (2013.01); *G06K 9/00805* (2013.01); *G08G 1/16* (2013.01); *B60W 2420/42* (2013.01); *B60W 2420/54* (2013.01); *G01S 13/93* (2013.01)

(58) Field of Classification Search
CPC . G01S 7/529; G01S 7/53; G01S 7/539; G01S 15/66; G01S 15/93; G01S 13/93; G06K 9/00805; G08G 1/16
See application file for complete search history.

(56) References Cited

U.S. PATENT DOCUMENTS

| | | |
|---|---|---|
| 2012/0327239 A1 | 12/2012 | Inoue et al. |
| 2016/0238700 A1 | 8/2016 | Matsuura et al. |
| 2019/0130752 A1* | 5/2019 | Takaki ................... B60R 21/00 |
| 2019/0276030 A1* | 9/2019 | Maeda .................. G01S 7/5276 |
| 2020/0098126 A1* | 3/2020 | Ozawa .................. G01S 17/931 |
| 2020/0331471 A1* | 10/2020 | Takahashi ......... B60W 60/0015 |
| 2020/0401825 A1* | 12/2020 | Ohkado ................ G01S 17/931 |

FOREIGN PATENT DOCUMENTS

| | | |
|---|---|---|
| JP | 8-201510 A | 8/1996 |
| JP | 2006-284293 A | 10/2006 |
| JP | 2009-174900 A | 8/2009 |
| JP | 2009-236623 A | 10/2009 |
| JP | 2013-057584 A | 3/2013 |
| JP | 2015-059764 A | 3/2015 |
| WO | 2011-145141 A1 | 7/2013 |

\* cited by examiner

FIG.1
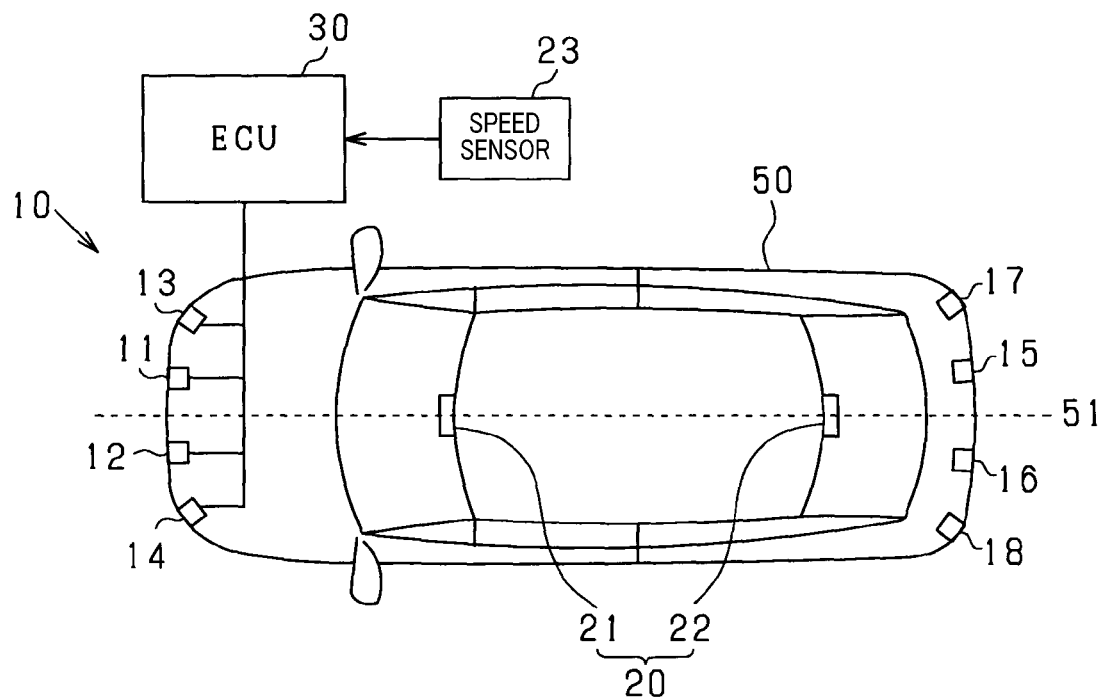
FIG.2
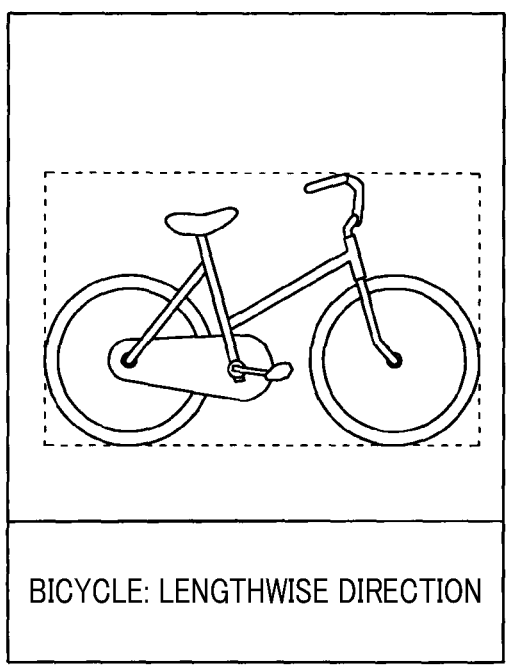
BICYCLE: LENGTHWISE DIRECTION
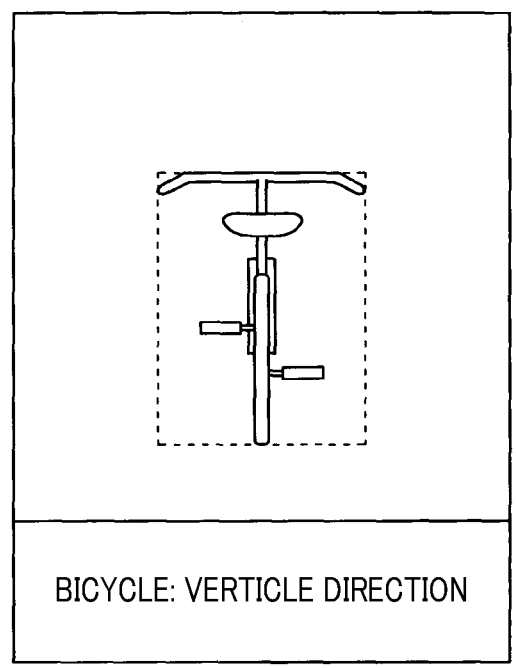
BICYCLE: VERTICLE DIRECTION

FIG.3
(a) (b)
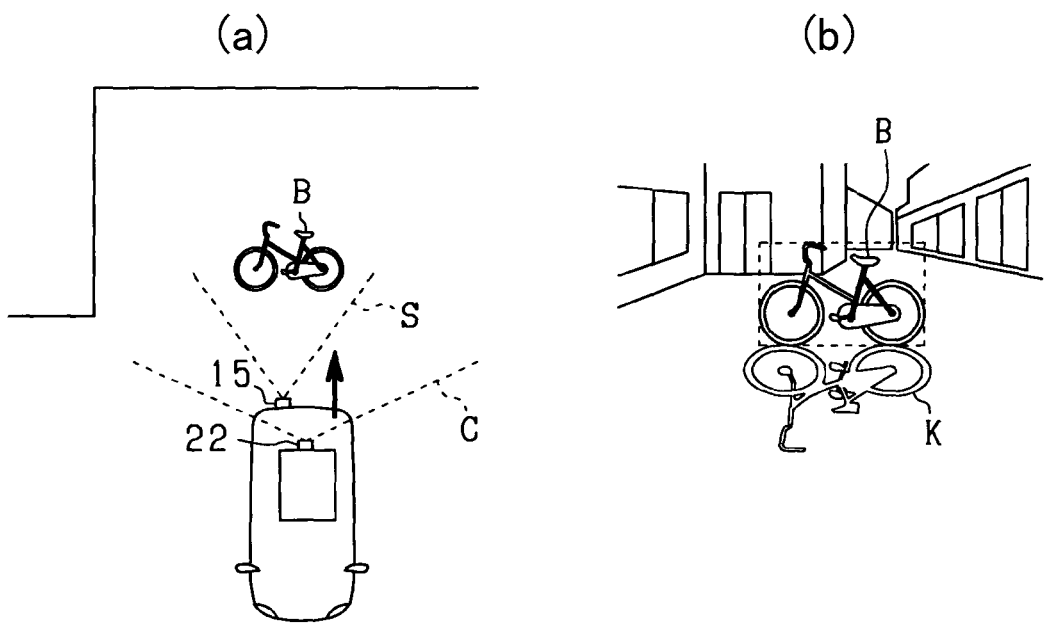
FIG.4
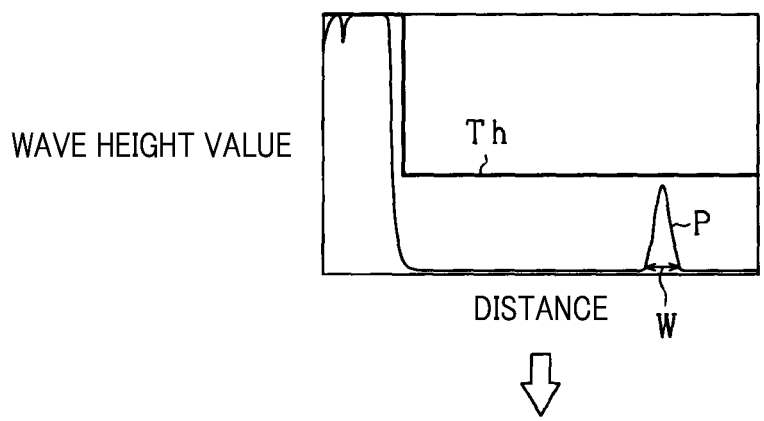
⇩
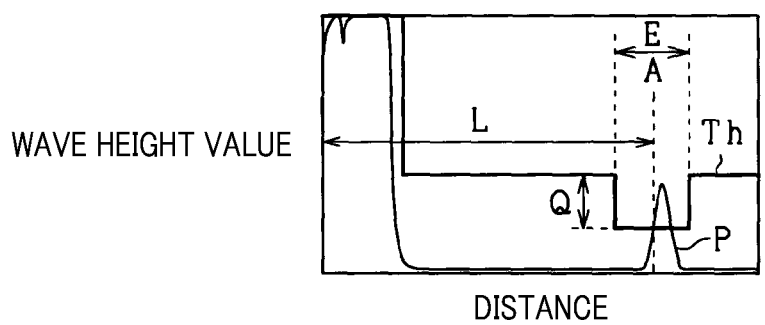

FIG.8
(a)
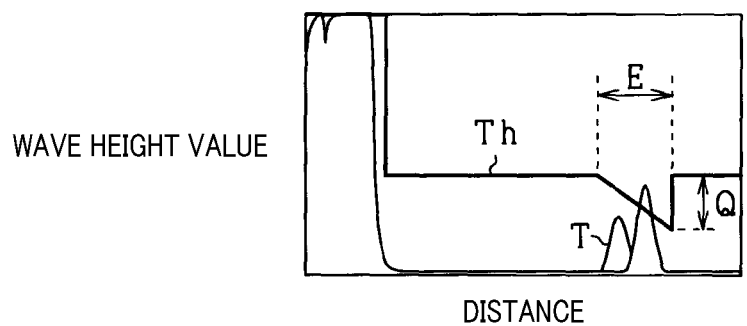
(b)
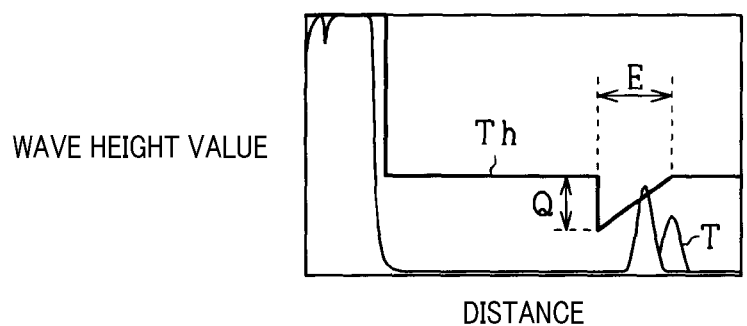
(c)
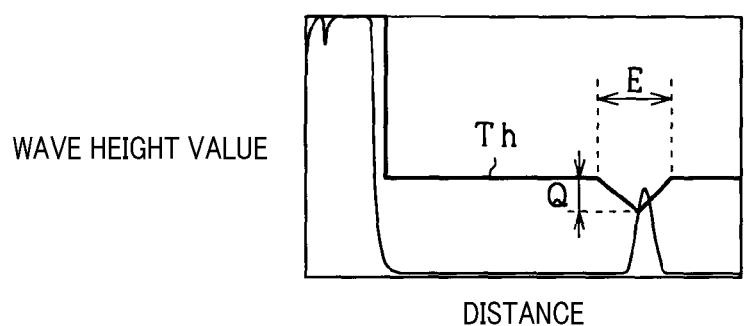

OBJECT DETECTION APPARATUS

CROSS REFERENCE APPLICATION

This application is a U.S. National Phase Application under 35 U.S.C. 371 of the International Application PCT/JP2017/036714, filed on Oct. 10, 2017 and published as WO2018/079252 on May 3, 2018. This application is based on and claim the benefit of priority from Japanese Application No. 2016-210555 filed on Oct. 27, 2016, the entire of each of which the above application are incorporated herein by reference. Also, any applications for which a foreign or domestic priority claim is identified in the Application Data Sheet as filed with the present application are hereby incorporated by reference under 37 CFR 1.57.

BACKGROUND

Technical Field

The present disclosure relates to an object detection apparatus which detects an object existing in a surrounding area of a vehicle in which the apparatus is mounted.

RELATED ART

Conventionally, a distance measurement sensor, for example, an ultrasonic sensor that is mounted in a vehicle detects objects, for example, preceding vehicles and pedestrians, which exist in a surrounding area of the vehicle. A system executes a vehicle control, for example, an operation of a brake apparatus based on detection results of the object.

For example, an ultrasonic wave sensor transmits scanning waves, and receives reflection waves, which corresponds to the scanning waves. An object is detected by acquiring a distance to the object based on the reflection waves. In this case, once the object is detected, for example, a detection threshold is for a reflection intensity of the reflection waves, and by controlling detection sensitivity of the object in this way, appropriate object detection is performed (For example, Patent literature 1).

CITATIONS

Patent Literature

International Publication 2011-145141A

However, when actually using a distance measurement sensor for detection of objects, the detection of reflection waves can be difficult depending on the type of object that is detected. As a consequence, vehicle control may be affected, based on detection results of the object.

For example, tire stoppers in a parking section, chain fencing that divides a space, a rope, and a bicycle, for example, are target detection objects of vehicle control, however these objects have low reflection intensity of reflection waves, and it is therefore difficult to detect these objects from the output of an ultrasonic wave sensor. Consequently, a vehicle control relative to these objects is not performed and various inconveniences may arise.

In order to resolve the above-described issues, the present disclosure aims to provide an object detection apparatus that can appropriately detect objects that are relevant to vehicle control.

SUMMARY

The present disclosure is an object detection apparatus. The object detection apparatus includes a distance measurement sensor that measures a distance to an object existing in a surrounding area of a vehicle, by transmitting scanning waves to the surrounding area of a vehicle and receiving reflection waves of the scanning waves, and an image acquiring section that is adopted to the vehicle and is provided with a vehicle camera that is an on-vehicle camera capturing images of the surrounding area of the vehicle, the imaging acquiring section acquiring an image that is imaged by the camera.

The object detection apparatus also includes a determination section that determines whether a predetermined object is included in the object image, based on the captured imaged, the predetermined object being an object in which object detection is difficult to perform by the reflection wave of the distance measurement sensor, a sensitivity controller that increases a sensitivity of the distance measuring sensor for object detection, when the predetermined object is included in the object image, and a vehicle controller that performs a vehicle control in which the predetermined object is a target object.

For example, when the sensitivity of the object detection is high, objects that are not used for vehicle control are also easily detected, and this may cause unnecessary operations when driving assistance is executed. In contrast, when the sensitivity of the detection of objects is not high, situations may arise in which objects that are desirably detected are not detected during vehicle control.

In the configuration according to the present disclosure, it is determined whether a predetermined object is included in the object image, when the predetermined object is an object that is difficult to detect from the reflection waves of the distance measurement. The object image is recognized based on the captured image of the camera, which is an on-vehicle camera. The predetermined object is recognized as a target object and the vehicle control is executed based on an output of the distance measurement sensor.

In this case, the predetermined object is determined based on the captured image, and by increasing the sensitivity of the object detection. As a result, the predetermined object can be detected on the basis of the output of the distance measurement sensor. That is, whilst recognizing an object by using the captured image of the on-vehicle camera, objects that are difficult to detect can be detected, by executing the object detection based on the output of the distance measurement sensor. Furthermore, vehicle control relative to an object may be appropriately performed.

BRIEF DESCRIPTION OF DRAWINGS

The purpose of the disclosure described above and other purposes, in addition to features and advantages thereof will become transparent with description described hereinafter with reference to drawings.

In the accompanying drawings;

FIG. 1 shows an overall configuration of an object detection system for a vehicle;

FIG. 2 is a descriptive view of a bicycle that is recognized based on a captured image;

FIG. 3 is a diagram describing a scene in which the vehicle approaches a close vicinity of a bicycle;

FIG. 4 is a diagram showing a state of a sensitivity control of an object detection according to a first embodiment;

FIG. 8 is a diagram that exemplifies a mode in which a threshold is decreased for a wave height value of reflection waves;

EMBODIMENTS OF THE DISCLOSURE

Figure 5:
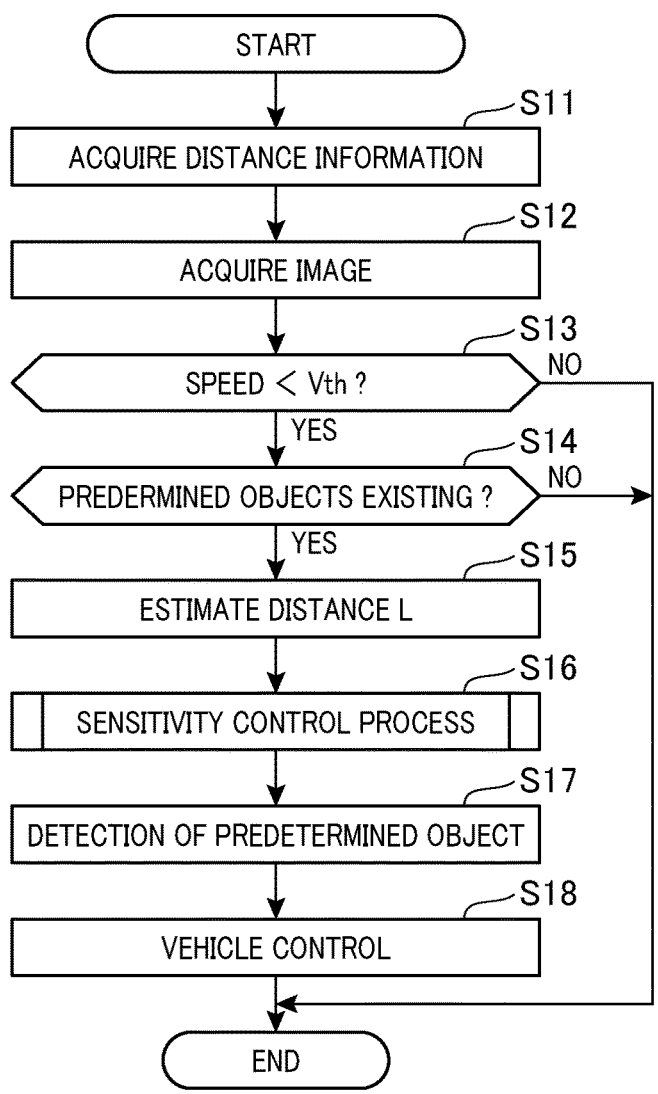
FIG. 5 is a flowchart showing an object detection process of the first embodiment.

Hereafter, embodiments of the present disclosure will be described in detail with reference to drawings. An object detection system which is mounted in a vehicle will be described for a first embodiment. In this system, an object detection apparatus (hereafter referred to as ECU) as a main component detects objects that exist in a surrounding area of a vehicle in which the system is mounted. The objects include other vehicles and various structures and obstacles on a road, for example.

Firstly, an overall configuration of the object detection system for a vehicle according to a first embodiment is described using FIG. 1. A vehicle 50 includes an ultrasonic wave sensor 10 as a distance measurement sensor, an on-vehicle camera 20 which images a surrounding of the vehicle, a speed sensor 23 and an ECU 30 (electronic control unit).

At each predetermined control cycle, the ultrasonic wave sensor 10 transmits ultrasonic waves as scanning waves and receives reflection waves that are reflected from an object. The ultrasonic wave sensor 10 outputs distance measurement information to the ECU 30 based on the reflection waves.

In the first embodiment, four sensors are mounted on a front part and bumper of a rear part of the vehicle 50 and arranged with a predetermined space between each sensor in a vehicle width direction. For example, a first sensor 11 and a second sensor 12 are symmetrically positioned to a centerline 51, in a close vicinity of the centerline 51, in the vehicle width direction, and two corner sensors 13 and 14 are mounted on a right corner and left corner, respectively. In the same way, two center sensors 15 and 16, and two corner sensors 17 and 18 are mounted on the rear bumper of the vehicle 50. These sensors are collectively provided as the ultrasonic wave sensor 10.

The on-vehicle camera 20 is a CCD camera, a CMOS image sensor, or an infrared camera, for example. In the first embodiment, a front camera 21 and a rear camera 22 are provided as the camera 20. The front camera 21 and the rear camera 22 are respectively mounted at a predetermined height in a center of the vehicle width direction of the vehicle 50 (for example, near a top end of a front glass and near a top end of a rear glass). The cameras 21 and 22 capture images from a bird's-eye view of regions that broaden in a predetermined angular range, towards a front vehicle area and a rear vehicle area. The bird's-eye view images that are imaged from the cameras 21 and 22 are input into the ECU 30. It is noted that the cameras 21 and 22 may be a single lens camera, or a stereo camera.

A vehicle speed sensor 23 detects a travelling speed of the vehicle 50 based on a rotating speed of wheel shaft. A detection result of the speed sensor 23 is input into the ECU 30.

The ECU 30 is configured as a computer equipped with a CPU and each type of memory, as a main component. The ECU 30 detects objects based on the distance measurement information that is output from the ultrasonic wave sensor 10. That is, a distance to an object is acquired based on a reflected intensity of reflection waves. The vehicle control is performed based on the distance that is acquired relative to the object. The vehicle control includes warning apparatus that notifies a user, for example, a driver of an existing object, and a brake apparatus that operates as a safety apparatus, for example. It is noted that the reflection intensity of the reflection waves is calculated based on a wave height value or amplitude when the ultrasonic wave sensor 10 receives the reflection waves.

Incidentally, the distance to the object is measured by the ultrasonic wave sensor 10, which transmits waves as the scanning waves, and receives waves that are reflected from the object. At this point, if a surface of the reflection waves of the scanning waves that are reflected from the object is large, the reflection intensity is high, compared to when the surface is small. Furthermore, if reflection surface is a flat surface, the reflection intensity increases compared to a reflection surface having a grooved surface. In contrast, objects which exist in positions that are lower than a mounted position of the ultrasonic wave sensor 10 (objects near to the ground surface) tend to have a low reflection intensity. The level of the reflection intensity is also affected by the material, for example, of the object.

From the tendency of the reflection intensity of objects described above, various objects are detected with difficulty. For example, objects such as, tire stoppers mounted in a parking section, a curb, a chain fencing that divides a space, a rope, a bicycle, and a shopping cart, are detected with difficulty by the object detection based on the output of the ultrasonic wave sensor 10.

A top drawing of FIG. 4 is a graph showing a relation between a wave height value as the reflection intensity of the reflection waves, and a threshold value Th as a detection threshold. It is noted that a horizontal axis represents a distance of the object from the vehicle 50. In order not to detect reflection waves that is based on residual scanning waves, the threshold is set at a high value in regions, which are adjacent or near to the vehicle 50. A reflection wave P represents the reflection waves that are derived from a bicycle, for example. That is, in this case the bicycle exists in a close vicinity of the vehicle. However, since the wave height value of the reflection wave P drops below the threshold Th, the bicycle is not detected. As a result, although the bicycle is categorized as an object that is used in vehicle control, the object may not be detected from the output of ultrasonic wave sensor 10, which in turn may cause inconveniences.

In the first embodiment, the vehicle 50 is equipped with the ultrasonic wave sensor 10 and the on-vehicle camera 20, and the ultrasonic wave sensor 10 determines whether a predetermined object is included in the object image that is recognized, based on the image captured by the camera 20. The predetermined object is an object that is difficult to detect by the waves that are reflected from the ultrasonic wave sensor 10. If it is determined that the predetermined object is included in the image, a sensitivity of the object detection is temporarily increased based on the ultrasonic wave sensor 10. The predetermined object is then recognized as a target object that is subject to detection and the vehicle control is performed based on the output of the ultrasonic wave sensor.

In this case, the captured image is used to recognize the predetermined objects in which object detection is difficult by the reflection waves of the ultrasonic wave sensor 10. The object detection is thus performed based on the output of the ultrasonic wave sensor 10, while performing object recognition based on the captured image, and the predetermined object can be detected.

The object image specifically is an object that is recognized in a captured image of the camera 20. In the present embodiment, the predetermined object is a bicycle, a chain fencing, a tire stopper, a rope, and a shopping cart, for example, which are objects that are difficult to detect based on the ultrasonic wave sensor 10.

The determination of the predetermined object based on the captured image is specifically the ECU 30 that acquires an image data from the on-vehicle camera 20, and determination of whether a predetermined object is contained in the captured image, which is performed on the basis of image data and preset information for distinguishing objects. The information for distinguishing objects are information that is provided individually for predetermined objects, such as, a bicycle, a metal fence, a vehicle, and a motorbike, in addition to information for objects which include a vehicle, a motorbike, and a pedestrian, for example. The information is pre-stored in a memory. It is noted that information for the predetermined objects are individually provided for different facing positions relative to the vehicle 50. For example, as shown in FIG. 2 (a) or (b), if the object is a bicycle, information of a horizontally faced pattern and a vertically faced pattern thereof may be prepared. The ECU 30 determines the type of predetermined object by matching the image data and the information.

For example, FIG. 3 (a) shows a scene where the vehicle 50 is backing towards a bicycle B, when the bicycle B is parked behind the vehicle 50. In this scene, the bicycle B is affiliated with an imaging region C of a rear camera 22, and also affiliated with a scanning region S of the scanning waves from the center sensor 15. In FIG. 3 (a), it is noted that for simplicity, a scanning region S is shown only for the center sensor 15.

FIG. 3 (b) shows a captured image of the scene acquired by a rear camera 22. The ECU 30 recognizes the bicycle B in the captured image, based on the image data of the captured image and the bicycle information (in this case the horizontally facing pattern of the bicycle) that is pre-stored. Therefore, the ECU 30 determines that a bicycle in contained in the object image.

The ECU 30 estimates a distance L from the vehicle 50 to the bicycle B, as a relative position of the bicycle B to the vehicle 50, based on the captured image of the on-vehicle camera 20. The estimation of the distance L may be performed by using a known method. For example, if the rear camera 22 is a stereo camera, parallax information is obtained for each pixel from images taken at the same time using a plurality of cameras, and the distance L to the bicycle B is thus estimated using the parallax information. If the rear camera 22 is a single lens camera, a moving stereo principle is used. Specifically, parallax information is acquired for each pixel from a plurality of frames that are taken at different timings and moving distances between frames, and the distance L to the bicycle B is thus estimated using the parallax information.

Next, a temporary increase of the sensitivity of the object detection based on the output of the ultrasonic wave sensor 10 will next be described in detail. A lower graph in FIG. 4 shows a space point of the distance L only from the vehicle 50, that is, a state in which the threshold Th of the wave height value of the reflection waves is a small value based on an estimated position A from the bicycle B. The reflection waves that are shown in FIG. 3 represent reflection waves that are received by the center sensor 15.

In this case, the ECU 30 sets threshold Th for the wave height value to a small value, in a predetermined range E that includes an estimated position of the bicycle B, in a distance direction, from the vehicle 50 to the bicycle B. That is, the threshold Th is set lower than a predetermined standard value by a predetermined quantity Q in the predetermined range E. A reflection wave P derived from the bicycle B exceeds the threshold, and a distance to the bicycle B is thus acquired. Moreover, the sensitivity of the object detection is increased by temporarily decreasing the detection threshold of the reflected intensity. As a further result, detection of predetermined objects is performed more easily.

The ECU 30 according to various conditions performs setting of the predetermined range E. Specifically, the ECU 30 sets the predetermined range E according to the type of predetermined object. The predetermined objects include objects that are detected with a small reflection wave width W (a wave height value is equal to higher than the predetermined value) and objects that are detected with large reflection wave width W. The predetermined range E is thus set taking into account the tendency of the width W of the reflection waves according to the predetermined objects.

In the first embodiment, it is noted that the predetermined range E is given as the same distance from a side immediately in front of the vehicle 50 (a near side to the vehicle 50) and an inner side (a far side from the vehicle 50) thereof, when the vehicle 50 is viewed with the estimated position A of the bicycle B in a center part.

The ECU 30 sets the predetermined quantity Q according to various conditions. That is, the quantity Q is set according to the type of predetermined object. As was described for the width W of the reflection waves, a wave height value of the reflection waves also differs depending on the predetermined object. The predetermined quantity Q is thus set taking into account a tendency of the height of the reflection waves to correspond with the predetermined objects.

It is noted that in the first embodiment, the predetermined quantity Q is set, and the threshold Th is set by decreasing the predetermined standard threshold by an amount of the predetermined quantity Q, however the setting of the predetermined threshold may be changed. For example, once a predetermined quantity QA is set, a threshold Th may be increased from a base line of a wave height value by the predetermined quantity QA. In this case, the predetermined quantity QA is a smaller value than a predetermined standard value. It is noted that the predetermined quantity QA may also be set in consideration of the tendency of the wave height value.

The object detection using the captured image will next be described using the flow chart shown in FIG. 5. The ECU 30 repeatedly performs the object detection at predetermined cycles.

At step 11, the distance measurement information from the ultrasonic wave sensor 10 is acquired. At step 12, a captured image that is output from the on-vehicle camera is acquired. It is noted that step 12 is an imaged acquiring section.

At step S13, it is determined whether the vehicle 50 is travelling at low speed. Specifically, the ECU 30 determines whether the vehicle speed is less than a threshold Vth. The threshold Vth is value that is provided to determine whether the speed of the vehicle 50 is a low speed, and is set to, 20 k/h, for example. In the first embodiment, the sensitivity of the object detection is increased when a stationary predetermined objects exists in a car parking area, or in a particular site, for example.

If the sensitivity is increased in the same way when a vehicle is travelling in a usual manner, an operation of the brake occurs frequently, and various inconveniences may occur. However, by providing a condition of the predetermined speed, occurrence of such inconveniences can be suppressed. It is noted that the threshold Vth may be changed. If it is determined YES at step S13, the process moves to step S14, however if it is determined as NO at step S13, the process is ended.

At step S14, it is determined whether a predetermined object is contained in the object image. At this point, as described above, a predetermined pattern matching of the predetermined object is used for the object image, and the predetermined object is determined. The type of predetermined object is distinguished. If the determination is YES at step S14, the process moves to step S15, however if the determination is NO at step S14, the process ends. The step S14 is the determination section. It is noted that if the determination is YES at step S14, the process from step S15 onwards is performed under conditions in which the object detection by the ultrasonic wave sensor S15 is not performed.

At step S15, the relative position of the predetermined object to the vehicle 50 is estimated based on the captured image of the on-vehicle camera 20. That is specifically, as described above, the distance L is estimated using the parallax information, for example. It is noted that step S15 is the position estimation section. Next at step S16, a sensitivity control process of the object detection is performed.

Figure 6:
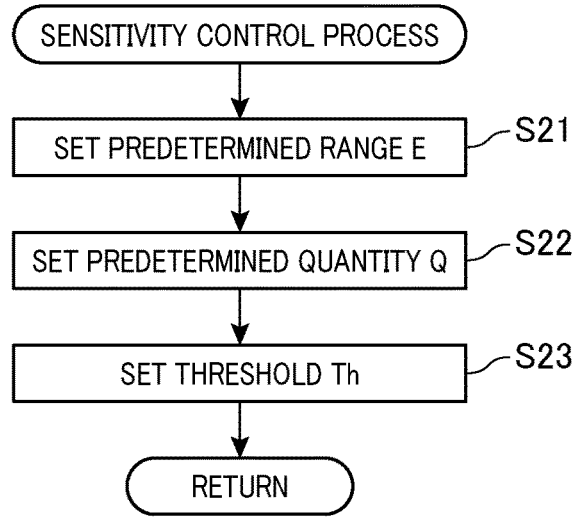
FIG. 6 is a flowchart showing a sensitivity control process of a first embodiment.

FIG. 6 shows a flowchart of the sensitivity control process of the object detection. At step S21, the predetermined range E is set according to the type of predetermined object that is distinguished at step S14. The width W of the reflected waves corresponding to a type of predetermined object is set by pre-matching. For example, if the width of the reflected waves is small, the ECU 30 sets the predetermined range E to a small predetermined range, when the width of the reflected waves tend to be small, compared to when the width W of reflection waves tends to be large.

At step S22, the predetermined quantity Q is set according to the type predetermined object that is identified at step S14. At this point, the wave height that corresponds to the type of predetermined object is set by the pre-matching. For example, the ECU 30 sets a large predetermined quantity Q when the wave height value has a tendency to be large value compared to when the wave height value that has a tendency to be a small value.

At step S23, the threshold Th of the wave height value is set based on values that are previously set at steps S21 and step S22. In this way, the threshold value Th is set to a smaller value than the predetermined standard value by the predetermined quantity Q, within the predetermined range E that is set at step S21. Specifically, the sensitivity of the object detection is temporarily increased. The process moves to step S17 in the flowchart shown in FIG. 5. It is noted that the sensitivity control process at step S16 corresponds to the sensitivity control section.

At step S17, a predetermined object is detected based on a sensitivity which is set by the sensitivity control process of the object detection. That is, the distance to the predetermined object is acquired based on the output of the ultrasonic wave sensor 10. Next, at step S18, the vehicle control is executed relative to the predetermined object that is detected. For example, the distance to the predetermined object is shown to the user, and by operating the brake apparatus, collision with the predetermined object is avoided. It is noted that step S18 corresponds to the vehicle control section.

Figure 7:
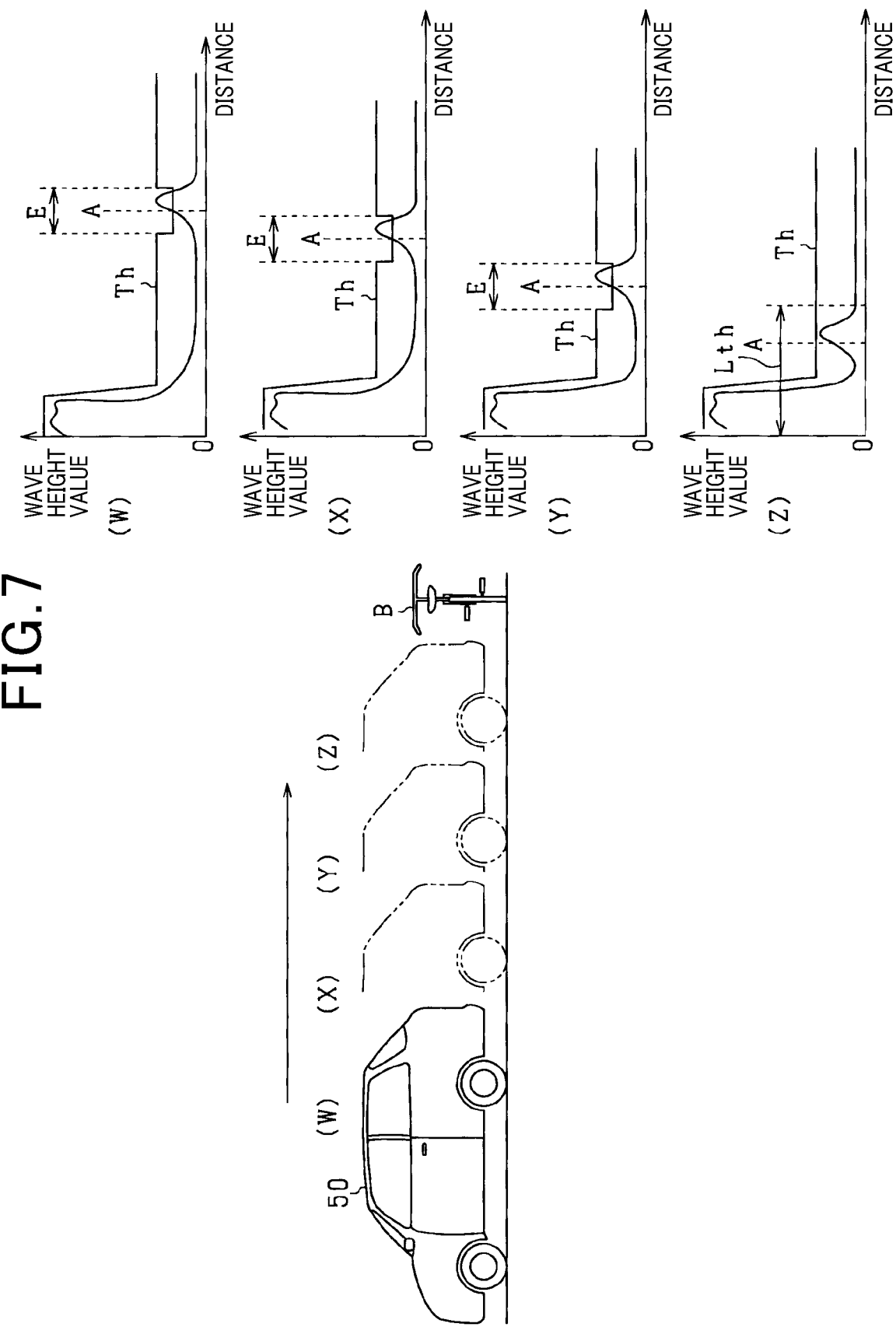
FIG. 7 is diagram showing a timely change of the sensitivity control of the object detection according to the first embodiment.

FIG. 7 shows a timely change of a control to increase the sensitivity of the object detection. As described above, the sensitivity control at the position W decreases the threshold Th, relative to the predetermined range E that includes the estimated position of the bicycle B. Thereafter, when the vehicle 50 approaches the bicycle B, the threshold Th is timely changed, in accordance with the distance of the bicycle B from the vehicle 50. That is, with the progression of the vehicle 50 from the position W→position X→position Y, since the estimated position A of the bicycle B approaches the vehicle 50, the position of the predetermined range E is changed to a side near to the vehicle 50 that in turn deceases the threshold Th.

Additionally, the position of the vehicle 50 reaches the position Z, and once the vehicle 50 and bicycle B are in close to each other, (for example, the relative position of A of the bicycle B has a predetermined distance which is equal to lower than Lth), the ECU 30 returns the sensitivity settings from the large value back to the original settings. That is the threshold Th of the wave-height value is reset back to the predetermined standard value. In other words, when the distance of the bicycle B is less than the predetermined distance, for example, a change in the sensitivity is prohibited.

The following effects may be obtained from the first embodiment described here above.

The object detection based on the output of the ultrasonic wave sensor 10 is a detection that is performed when the object is difficult to detect by the reflection intensity, for example. In the case of such object detection, various inconveniences occur by not performing the vehicle control.

However, according to the configuration, the ECU 30 determines whether a predetermined object is included in the object image, when the predetermined object is an object that is difficult to detect by the reflection waves of the ultrasonic wave sensor 10. The recognition of the predetermined object is based on the captured image of the on-vehicle camera 20. When it is determined that the predetermined object is included in the image, the sensitivity of the object detection by ultrasonic wave sensor 10 is temporarily increased. The predetermined object is thus a target object, and the vehicle control is performed on the basis of the output of the ultrasonic wave sensor 10. In this case, determination of whether the predetermined object exists is performed on the basis of the captured image, and the sensitivity of the object detection is temporarily increased, thus the predetermined object is detectable on the basis of the output of the ultrasonic wave sensor 10.

That is, whilst recognizing an object by using the captured image of the on vehicle camera 20, objects that are difficult to detect can be detected by executing the object detection based on the output of the distance measurement sensor. Furthermore, a precise distance of the predetermined object is acquired. As a result, a vehicle control can be performed in an appropriate manner.

Specifically, when it is determined that a predetermined object is contained in the captured image, the relative distance of the predetermined object from the vehicle 50 is estimated. In this case, since the sensitivity is increased in the predetermined range E range, which includes the estimated relative position of the predetermined object, an increase in the sensitivity can be limited relative to the predetermined object. As a result, the detection of objects that are not target objects of the vehicle control can be avoided whilst detecting the predetermined objects is an appropriate manner.

The width W of the reflection waves differs depending on the type of predetermined object. That is, the predetermined range E is set according to the type of predetermined object, for example, the predetermined range E can be set to a small value, when the object has a tendency to have smaller width W of the reflection waves, than an object that has a tendency to have a large width W of the reflection waves. According to the configuration, the increase in the sensitivity can be limited depending on the type of object. As a result, the predetermined range E can be appropriately set to the predetermined object, and the sensitivity may also be set for each predetermined object.

In consideration of the wave height value of the reflection waves that differs for each type of predetermined object, a predetermined quantity Q is set for each type of predetermined object. For example, the predetermined quantity Q may be set large, when the tendency of the wave height value of the obstacle is larger than when the tendency of the wave height value is small, and the sensitivity may also be increased according to the type of object. As a result, a suitable predetermined quantity Q may also be set for each predetermined object, in addition to a suitable sensitivity.

After the threshold Th of the wave height value of the reflection waves is decreased, the change in the sensitivity is prohibited when the relative position A of the predetermined objects is equal to or less than the predetermined distance Lth, when the vehicle 50 approaches near to the predetermined object. That is, at this point the threshold Th is returned to the predetermined standard value. In this case, if the threshold Th is decreased even when a distance to the object is equal to or lower than the predetermined distance Lth, reflection waves are recognized based on effects of the scanning waves, and an object may be erroneously detected, although an object is not actually present. In such situations, unnecessary operations may be performed. However, according to the configuration described above, whilst suppressing unnecessary operations, the predetermined objects may be detected in a suitable manner.

The first embodiment may be modified as follows.

In the first embodiment, the threshold Th of the wave height value of the reflection waves is decreased as a control of increasing the sensitivity of the object detection by the ultrasonic wave sensor 10, however the configuration is not limited to that described. For example, in an amplification process that is relative to a reflection wave voltage output from the ultrasonic wave sensor 10, an increase of an amplifying percent (gain) can be limited relative to the reflected voltage of the estimated position A of the predetermined object. Additionally, a configuration that includes this modification may also be provided.

In the first embodiment, the threshold Th of the wave height of the reflection waves is decreased by a consistent predetermined quantity Q, relative to the predetermined standard value in the predetermined range. However, the configuration is not limited to the above described. That is, the threshold Th may be arbitrarily modified in the predetermined range E. For example, modes that are shown in FIG. 8 (a) to (c) may also be provided.

FIG. 8 (a) exemplifies a threshold Th that is decreased, further the distance from the vehicle 50 is increased in a predetermined range E. FIG. 8 (b) exemplifies a threshold Th that is increased, the further the distance from the vehicle 50 is decreased in a predetermined range E, and FIG. 8 (c) exemplifies a threshold Th that is decreased closer to an estimated position A of the predetermined object in a predetermined range E. It is noted that in any one of these modes described, the value of the threshold Th is decreased to the greatest extent based on a predetermined quantity Q.

In this way, by changing a mode to decreasing the threshold Th in the predetermined range E, it is considered that only predetermined objects can be precisely detected. For example, as shown in FIG. 8 (a) to (c), when objects other than the predetermined objects that are not target objects of vehicle control (for example, empty cans) exist in a close range of a predetermined object, a configuration in which these other objects are not detected, whilst detecting only the predetermined object can be provided. The reflection waves T in the FIG. 8 (a) to (c) are derived from the other objects that are not target objects of vehicle control. The relative position of a predetermined object is estimated from the vehicle 50, specifically, when the estimated distance L to a predetermined object is estimated with high precision, by adopting the mode 8 (c), only the predetermined object can be suitably detected.

According to the first embodiment described, step S21 in FIG. 6, the predetermined range E is set according to the type of predetermined object, however the configuration is not limited that of the above described. For example, the predetermined range E may be set according to reliability of an estimated length L to a predetermined object, based on a captured image. In this case, the higher the reliability of the length L is the smaller the predetermined range E is set. It is noted that the reliability of the length L is calculated based on distribution of edge points of the predetermined object, in a distance direction, from the vehicle 50 to the predetermined object.

Figure 9:
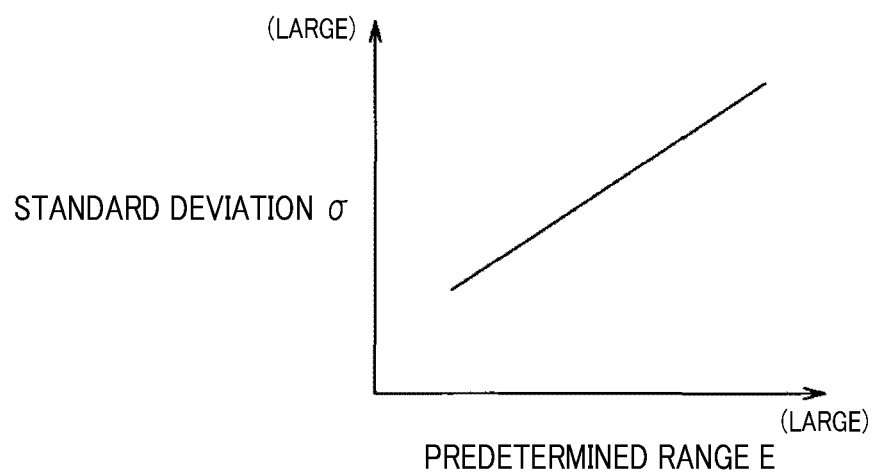
FIG. 9 is a graph showing a relation between a predetermined range and a standard deviation showing a distribution of edge points of a predetermined object.

In FIG. 9 a relation between the standard deviation 6 of distribution of the edge points of a predetermined object and a predetermined range E are shown. It is noted that the larger the standard deviation 6, the larger the dispersion of the distribution, and the range of the distribution is broad. In contrast, the smaller the standard deviation of σ, the higher the reliability of the distance L is, and the predetermined range E is thus decreased. When the distribution of the edge points of the predetermined object is small, the predetermined object can be selectively detected by a small predetermined range E, compared to when the distribution of the edge points is large.

In the first embodiment, at step S21 in FIG. 6, the predetermined range E is set as an equal distance away from, the center of the estimated position, in the horizontal direction, however, a predetermined range is not limited to these settings. For example, the predetermined range E may be set, so that a range on a side immediately in front of the vehicle 50 is set to be larger than a range on inside thereof, with the estimated position A in the center part when viewed from the vehicle 50. The predetermined range E may also be set a beyond a predetermined distance that includes the estimated position A.

Figure 10:
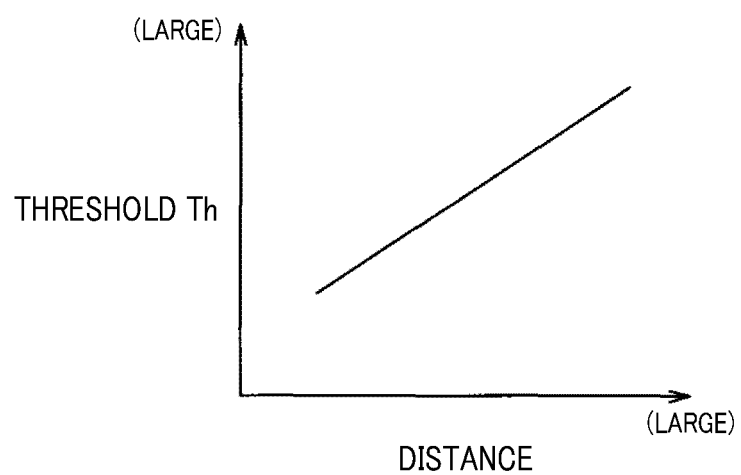
FIG. 10 is a graph showing a relation between a distance to the predetermined object and a threshold of the wave height value.

According to the first embodiment, as shown in FIG. 7, a configuration is provided in which a position of the predetermined range E is changed according to the distance L, from the vehicle 50 to the bicycle B that is based on the captured image. However, in addition to the configuration described, a predetermined threshold Th that is a value of the predetermined threshold Th (for example, the predetermined quantity Q) may be changed in accordance with the distance L. For example, FIG. 10 shows a relation between the distance L and the threshold Th is based on the captured image. As shown in FIG. 10, the smaller the distance L is to the object, the smaller the threshold Th. The closer the object is to the vehicle 50, the more the sensitivity for the object is increased. Also in the configuration described, as a distance to the predetermined object is decreased, that is the closer the predetermined object is positioned from the vehicle 50, a higher precision of the distance to the predetermined object can be acquired, and the vehicle operation may be executed in an appropriate manner.

It is noted that in the configuration described, once the estimated position A of the predetermined object reaches the predetermined distance Lth, relative to the vehicle 50, the threshold Th that is decreased can be returned to the original value.

For example, predetermined objects are recognized by pattern matching, and although a position of the predetermined object has been previously estimated, since the pattern matching is not performed appropriately in the next image process, the recognition of the predetermined object may not be appropriately performed. In this case, if the sensitivity control for the object detection is not performed, the detection of the predetermined object may not be continuously performed based on the output of the ultrasonic wave sensor 10. In consideration of these issues, a configuration in which tracking of an estimated position A of the predetermined object is performed when the vehicle 50 is moving, may also be provided based on the captured image. It is noted that the ECU 30 performing the tracking process of the estimated position A of the predetermined object is a tracking section.

According to the configuration, the estimated position A of the predetermined object that is estimated at step S15 is recorded, and as a further requirement, an estimated position A of the predetermined object is updated based on the moving distance of the vehicle 50, for example. The sensitivity control process may be performed, based on the updated estimated position A. According to the configuration, even in a case where image processing is not temporarily performed, continuous object detection can be performed based on the output of the ultrasonic wave sensor 10, without disrupting the sensitivity control.

There are regions on an image that are not suitable regions to estimate a position of an object. For example, on a right-end region or a left-end region, since distortional effects are increased, when objects are recognized in these regions, the estimated precision of the object position may decrease. Furthermore, on an upper region of an image, even when an object exists in this region, since the possibility of collision with this object is extremely low, there are situations in which the position of the object is not estimated. However, if an object is detected in such a region, an object that is associated with sudden steering operation of the vehicle 50, for example, this object becomes target objects of the vehicle control.

In consideration of the above, if the predetermined objects acquired by an estimated position A based on the captured image moves to a region that is not suitable for the estimation of the object position, tracking may be used to match the estimated position of the object A that was previously estimated with a movement of the vehicle 50. However, according to the configuration, when the predetermined object moves to a position that is not suitable to estimate the position of the object, the object detection may be continuously performed on the basis of the output of the ultrasonic wave sensor 10.

In this case, a sensitivity of the object detection by the ultrasonic wave sensor 10 may be set as a multi-step process in a predetermined range, and the sensitivity may be increased in multiple steps under conditions that the predetermined object is not detectable by the sensitivity that is set at that particular point in time. In this configuration, the ECU 30 increases the sensitivity until the predetermined object is detected. It is noted that a determination process in which the predetermined object is not detected, which is performed by the ECU 30, is a detection determination process.

In FIG. 5, at step S14, when the determination of the predetermined object is performed based on the captured image, in a situation of a metal fence existing in an area that is above the road surface (ground surface) for example, if a shadow of this metal fence is imaged in a position that that appears to be nearer to the vehicle than the actual metal fence, the shadow may be erroneously recognized at the fence itself. In FIG. 3 (b), a shadow K that extends in front of the bicycle B may also may be erroneously recognized as an object. In both cases described hereinabove, if the sensitivity of the object is increased relative to a position of the shadow, neither the metal fence nor the bicycle is detected.

In consideration of the above described, once the sensitivity of the object detection by the ultrasonic wave sensor 10 is increased, if a predetermined object is not detected in this state, a configuration in which a change in the sensitivity is prohibited, may also be provided. That is, when a threshold Th of the wave height value of the reflection waves is decreased until a reflection from the road surface is acquired, if a predetermined object is not detected, the threshold Th may be set to the predetermined standard value. As a consequence, when a predetermined object is erroneously recognized based on the captured image, unnecessary operations of the object detection may be avoided.

In the first embodiment, the ultrasonic wave senor 10 is used as a distance measurement sensor, however, the transmission and the reception of the scanning waves is not limited to the above described. For example, a milli-wave radar, and a laser radar, for example, may also be used.

It is to be understood that, the present disclosure is described in accordance with the embodiments, however, not limited to the above described. That is, the present disclosure includes various modified examples and modifications within the equivalent ranges. In addition, various combinations and modes which include a combination of one element, more than one element are included within category and the scope of the disclosure.

The invention claimed is:
1. An object detection apparatus comprising:
a distance measurement sensor that measures a distance to an object existing in a surrounding area of a vehicle by transmitting scanning waves to the surrounding area of the vehicle and receiving reflection waves of the scanning waves;
an image acquiring section that is adopted to the vehicle and is provided with an on-vehicle camera that captures images in the surrounding area of the vehicle, the imaging acquiring section acquiring an image that is captured by the on-vehicle camera;
a determination section that determines whether, a predetermined object is included in an object image, based on the captured imaged, the predetermined object being an object in which object detection is difficult to perform by the reflection waves of the distance measurement sensor;

a sensitivity controller that increases a sensitivity of the distance measurement sensor of object detection, when the predetermined object is included in the object image, a position estimation section configured to estimate a relative position of the predetermined object, relative to the vehicle, when the determination section determines that a predetermined object is included in the object image, and a vehicle controller that performs a vehicle control in which the predetermined object is a target object, wherein the on-vehicle camera is a single lens camera based on imaging of stereo camera or a moving stereo, and when the determination section determines that the predetermined object is included in the object image, the sensitivity controller increases the sensitivity in a predetermined range that includes the relative position of the predetermined object, in a direction in which a distance from the vehicle to the predetermined object is taken, and sets a size of the predetermined range based on dispersion of features points of the predetermined object, in the direction from the vehicle to the predetermined object.

2. The object detection apparatus according to claim 1, wherein the determination section determines whether the predetermined object is included in the object image and a type of predetermined object, and the sensitivity controller sets the predetermined range based on the type of predetermined object.

3. The object detection apparatus according to claim 2, comprising:

a tracking section that tracks the relative position of the predetermined object, when the vehicle is moving, wherein the position estimation section updates the relative position of the predetermined object based on the relative position of the object that is tracked by the tracking section.

4. The object detection apparatus according to claim 2, wherein the determination section determines whether the predetermined object is included in the object image, and the sensitivity controller increases the sensitivity by decreasing a detection threshold that compares a signal intensity which is output from the distance measurement sensor and sets the detection threshold based on the type of predetermined object that is determined by the determination section.

5. The object detection apparatus according to claim 2, wherein the closer the distance is from the vehicle to the predetermined object, the more the sensitivity is increased by the sensitivity controller.

6. The object detection apparatus according to claim 2, wherein the sensitivity controller prohibits a change of the sensitivity, when the distance of the predetermined object relative to the vehicle is equal to or lower than a predetermined distance.

7. The object detection apparatus according to claim 2, comprising:

a detection determination section that determines that the predetermined object is not detected, after the sensitivity is increased by the sensitivity controller, wherein the sensitivity controller prohibits the change in the sensitivity, when the detection determination section determines that the predetermined object is not detected.

8. The object detection apparatus according to claim 2, comprising:

a detection determination section that determines that the predetermined object is not detected, after the sensitivity is increased by the sensitivity controller, wherein the sensitivity controller prohibits the change in the sensitivity, when the detection determination section determines that the predetermined object is not detected.

9. The object detection apparatus according to claim 1, comprising:

a tracking section that tracks the relative position of the predetermined object, when the vehicle is moving, wherein the position estimation section updates the relative position of the predetermined object based on the relative position of the object that is tracked by the tracking section.

10. The object detection apparatus according to claim 9, wherein the determination section determines whether the predetermined object is included in the object image, and the sensitivity controller increases the sensitivity by decreasing a detection threshold that compares a signal intensity which is output from the distance measurement sensor and sets the detection threshold based on the type of predetermined object that is determined by the determination section.

11. The object detection apparatus according to claim 9, wherein the closer the distance is from the vehicle to the predetermined object, the more the sensitivity is increased by the sensitivity controller.

12. The object detection apparatus according to claim 9, wherein the sensitivity controller prohibits a change of the sensitivity, when the distance of the predetermined object relative to the vehicle is equal to or lower than a predetermined distance.

13. The object detection apparatus according to claim 9, comprising:

a detection determination section that determines that the predetermined object is not detected, after the sensitivity is increased by the sensitivity controller, wherein the sensitivity controller prohibits the change in the sensitivity, when the detection determination section determines that the predetermined object is not detected.

14. The object detection apparatus according to claim 1, wherein the determination section determines whether the predetermined object is included in the object image, and the sensitivity controller increases the sensitivity by decreasing a detection threshold that compares a signal intensity which is output from the distance measurement sensor and sets the detection threshold based on the type of predetermined object that is determined by the determination section.

15. The object detection apparatus according to claim 14, wherein the closer the distance is from the vehicle to the predetermined object, the more the sensitivity is increased by the sensitivity controller.

16. The object detection apparatus according to claim 14, wherein
the sensitivity controller prohibits a change of the sensitivity, when the distance of the predetermined object relative to the vehicle is equal to or lower than a predetermined distance.

17. The object detection apparatus according to claim 14, comprising:
a detection determination section that determines that the predetermined object is not detected, after the sensitivity is increased by the sensitivity controller, wherein
the sensitivity controller prohibits the change in the sensitivity, when the detection determination section determines that the predetermined object is not detected.

18. The object detection apparatus according to claim 1, wherein
the closer the distance is from the vehicle to the predetermined object, the more the sensitivity is increased by the sensitivity controller.

19. The object detection apparatus according to claim 1, wherein
the sensitivity controller prohibits a change of the sensitivity, when the distance of the predetermined object relative to the vehicle is equal to or lower than a predetermined distance.

20. The object detection apparatus according to claim 1, comprising:
a detection determination section that determines that the predetermined object is not detected, after the sensitivity is increased by the sensitivity controller, wherein
the sensitivity controller prohibits the change in the sensitivity, when the detection determination section determines that the predetermined object is not detected.

* * * * *